Figure 1:
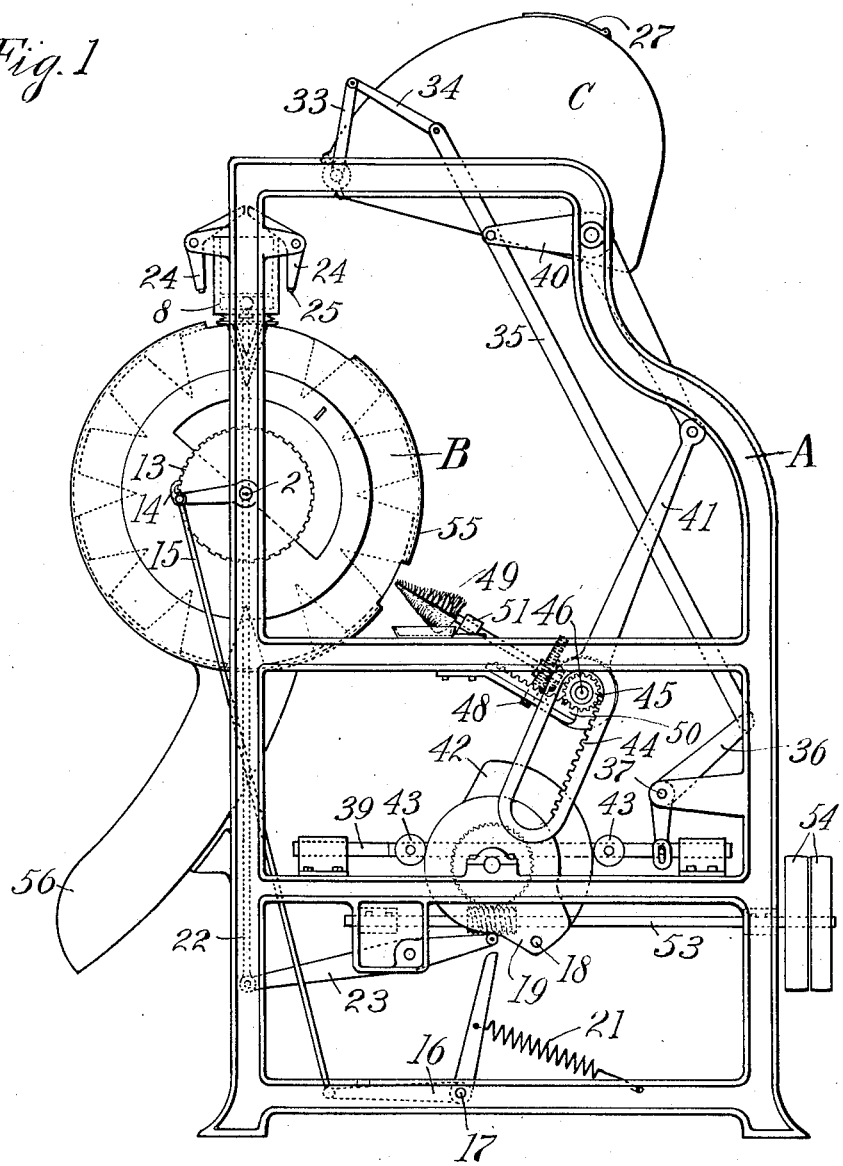

M. POHLIG.
COOKING APPARATUS.
APPLICATION FILED SEPT. 6, 1907.

1,047,122.

Patented Dec. 10, 1912.

6 SHEETS—SHEET 1.

Witnesses,
George Voelker
Hattie Smith

Inventor,
Martin Pohlig
by Lothrop & Johnson
his Attorneys.

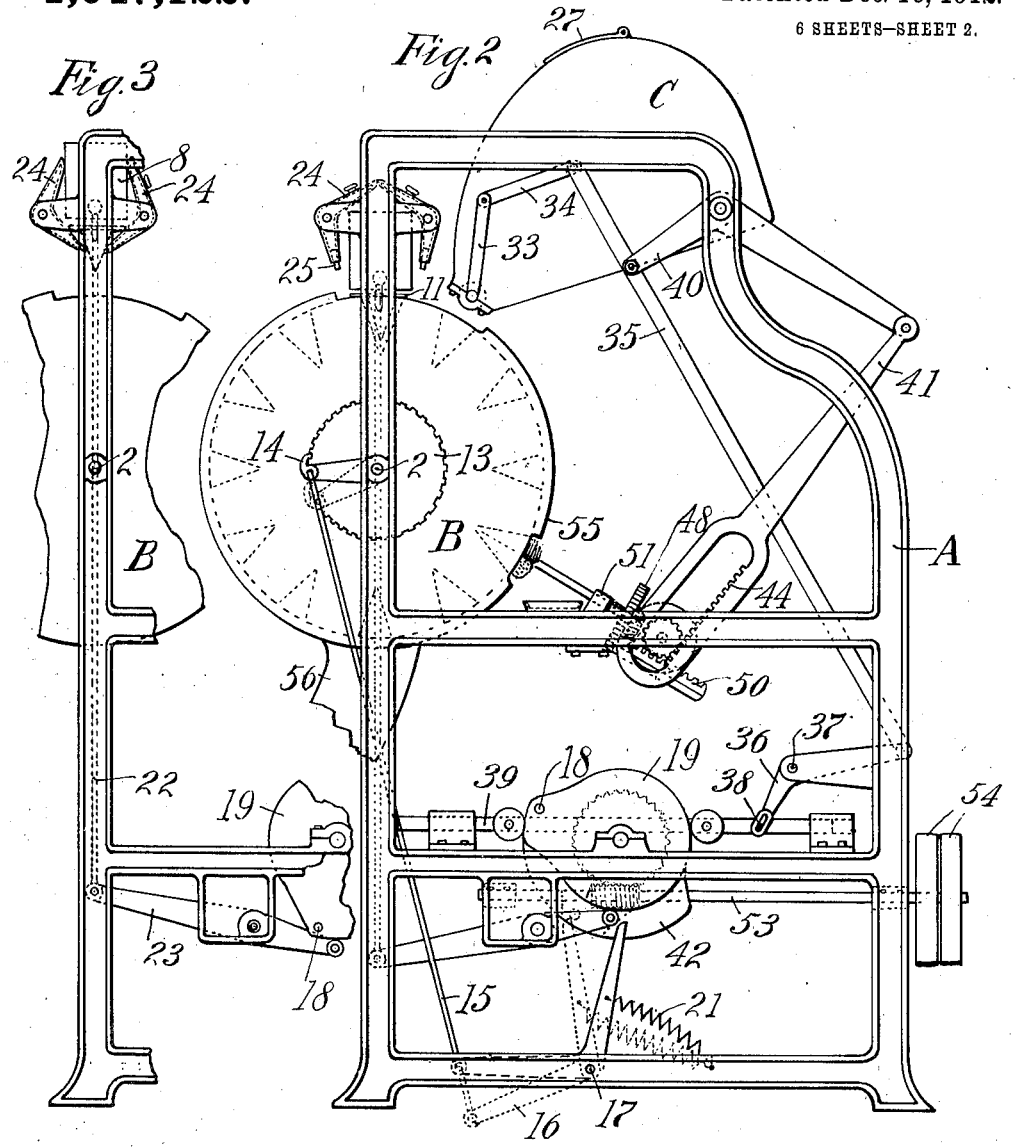

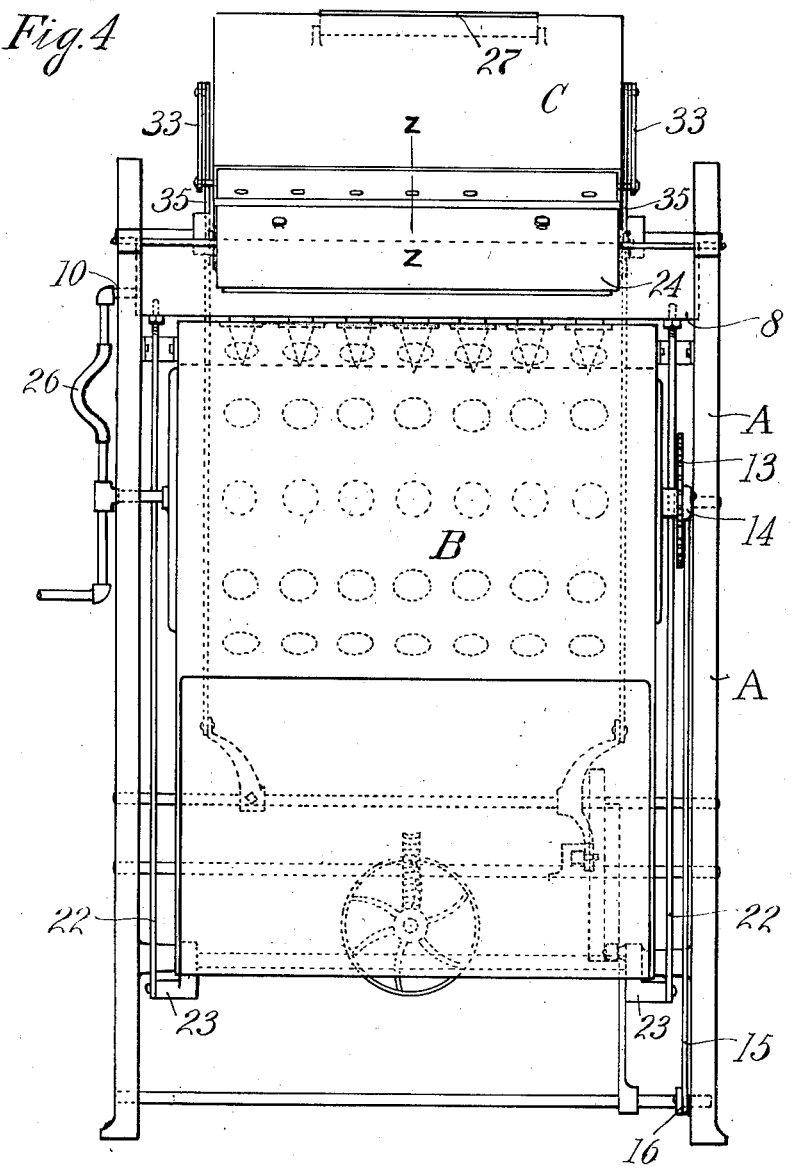

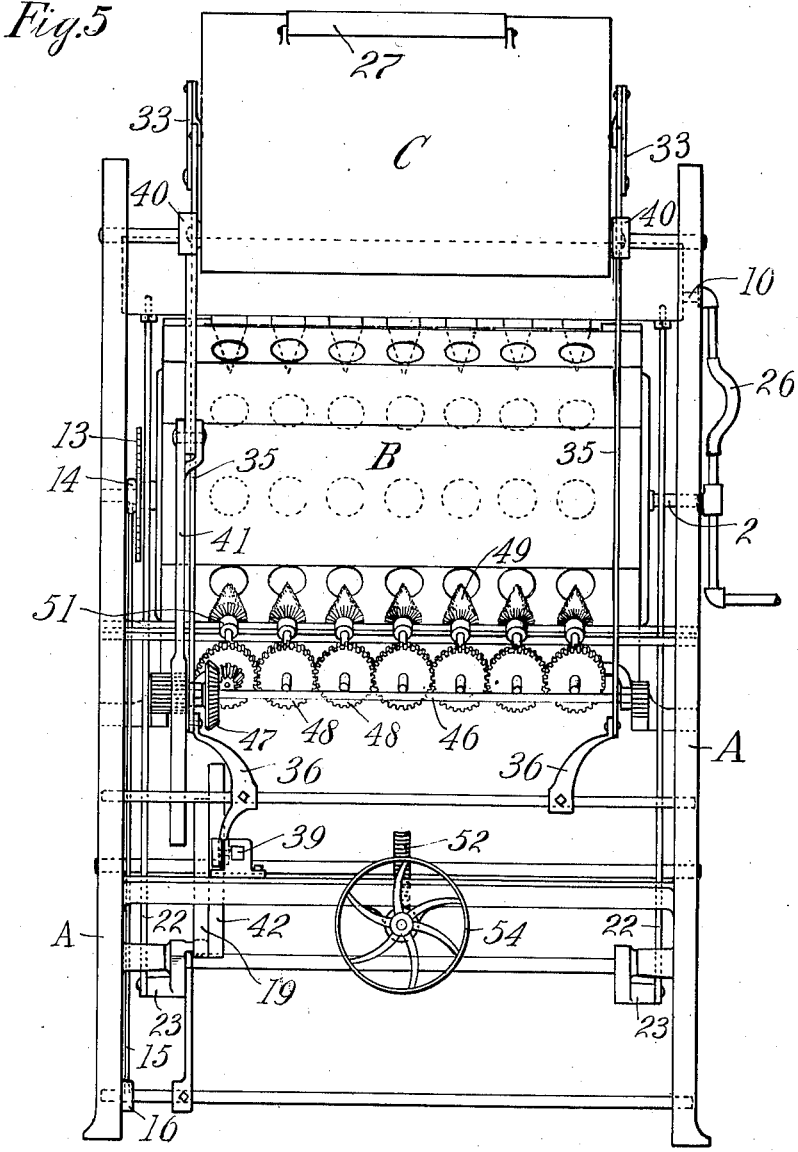

M. BOHLIG.
COOKING APPARATUS.
APPLICATION FILED SEPT. 6, 1907.
1,047,122.
Patented Dec. 10, 1912.
6 SHEETS—SHEET 5.
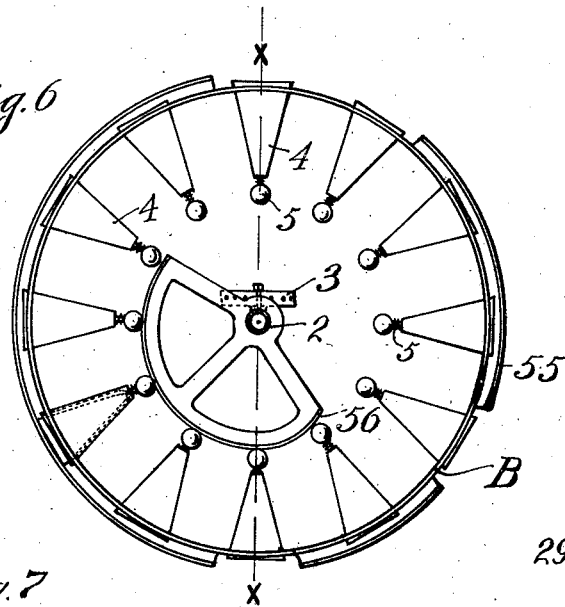
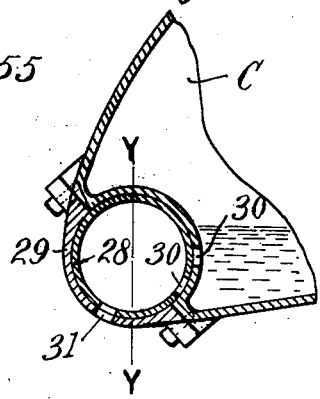
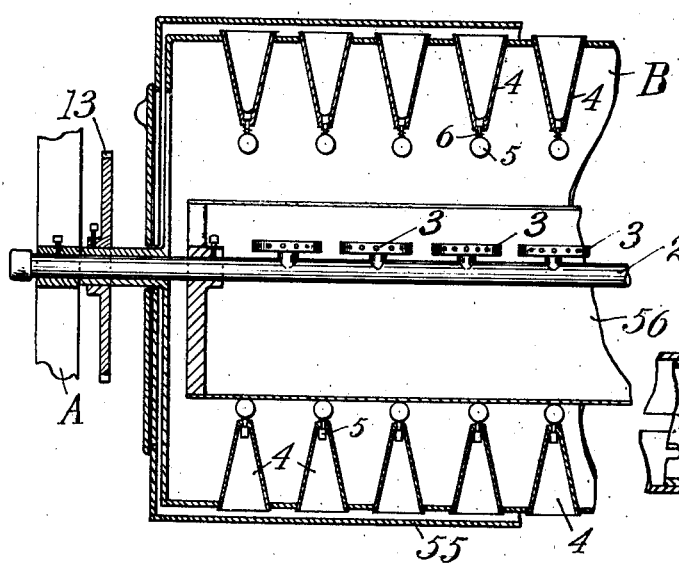
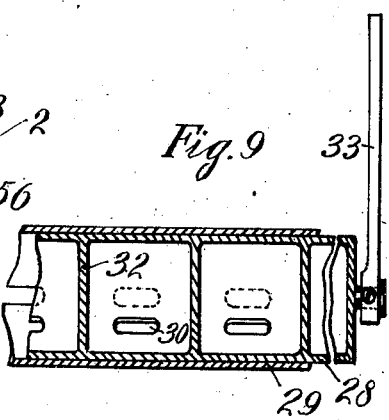
Witnesses,
George Voelker
Hattie Smith
Inventor,
Martin Bohlig
by Lothrop & Johnson
his Attorneys.

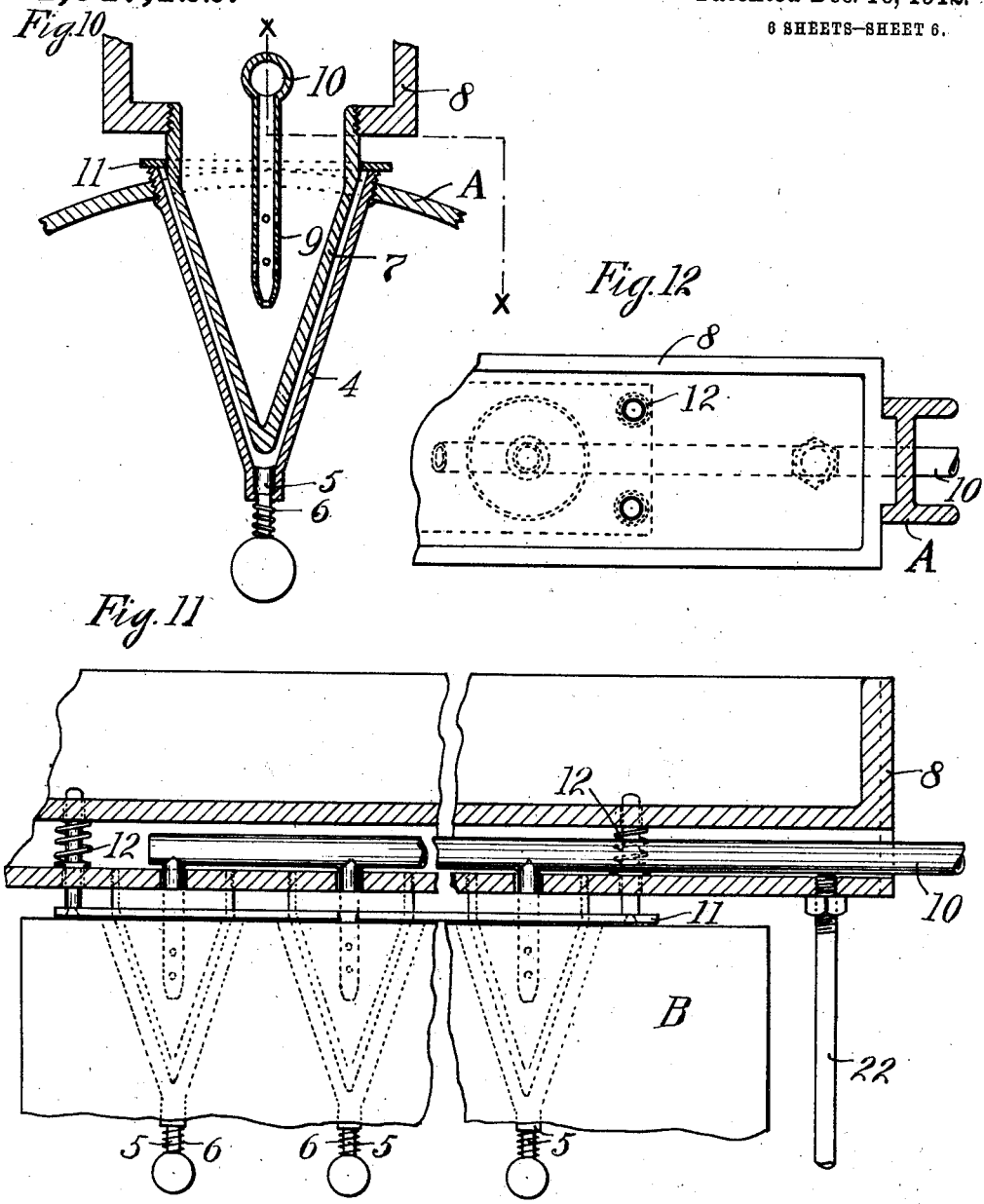

UNITED STATES PATENT OFFICE.

MARTIN BOHLIG, OF ST. PAUL, MINNESOTA, ASSIGNOR TO BOHLIG MANUFACTURING COMPANY, OF ST. PAUL, MINNESOTA, A CORPORATION OF MINNESOTA.

COOKING APPARATUS.

1,047,122. Specification of Letters Patent. Patented Dec. 10, 1912.

Application filed September 6, 1907. Serial No. 391,576.

*To all whom it may concern:*

Be it known that I, MARTIN BOHLIG, a citizen of the United States, residing at St. Paul, in the county of Ramsey and State of Minnesota, have invented certain new and useful Improvements in Cooking Apparatus, of which the following is a specification.

My invention relates to improvements in cooking apparatus its object being particularly to provide a machine for making pastry cornets.

To this end my invention consists of a traveling oven provided with a series of molds together with means for automatically feeding dough to said molds; for forming the cornets and for removing the same to a suitable receptacle.

In the accompanying drawings forming part of this specification, Figure 1 is a side elevation of my improved machine with the parts in normal position; Fig. 2 is a similar view with the dough receptacle in feeding position; Fig. 3 is a side elevation of the front end of the machine; Fig. 4 is a front elevation of the machine; Fig. 5 is a rear elevation of the machine; Fig. 6 is an end view of the oven with the end wall removed; Fig. 7 is a section on line x—x of Fig. 6; Fig. 8 is a section on line z—z of Fig. 4; Fig. 9 is a section on line y—y of Fig. 8; Fig. 10 is a central vertical section of one of the molds; Fig. 11 is a section on line x—x of Fig. 10; and Fig. 12 is a partial top view of Fig. 11.

In the drawings A represents the frame work of the machine, and B the oven mounted upon a hollow shaft 2 journaled in the front uprights of the frame work. The hollow shaft 2 supports a series of burners 3 for heating the oven as hereinafter pointed out. The oven B is preferably of cylindrical shape supporting in its periphery a plurality of rows of cone shaped mold members 4. Slidable in the inner end of each mold member 4 is a weighted plunger 5 normally held pressed outward by a spring 6. Arranged to work in connection with the mold members 4 are a row of mold members 7 carried by a bar 8 slidably supported in the side bars immediately above the oven. The mold members 7 are adapted to be heated by means of the burners 9 extending downwardly from a gas pipe 10 supported by said bar into said members 7. In order to separate the cornets from the mold members 7, as hereinafter pointed out, I provide a plate 11 slidably supported by the bar 8 and normally held pressed downward by coil springs 12.

Intermittent movement is imparted to the oven and to the bar 8 by the following described mechanism: Secured upon one end of the oven is a ratchet wheel 13 with which engages the pivotally supported pawl 14. The free end of said pawl is connected by a rod 15 with one end of a bent lever arm 16, said lever arm having fulcrum support 17 in the base of the machine. The opposite end of said lever arm is engaged by a pin 18 carried by a cam 19 mounted upon a main horizontal driving shaft. The free end of the lever 16 is connected with the frame work by a restraining spring 21. The bar 8 is raised and lowered by means of a rod 22 connecting said bar with one end of a fulcrum lever 23, the opposite end of said lever being engaged by the hereinbefore mentioned cam 19 as indicated in Fig. 3.

In order to grease the inner mold members 7 I provide a plurality of pairs of bent levers 24 pivotally supported upon opposite sides of the front uprights of the frame, said levers carrying at their lower ends suitable grease depositing devices 25. When the bar 8 is raised as shown in Fig. 4 it passes between and separates the upper ends of the levers 24 carrying said grease devices into contact with the mold members 7. In order to allow the raising and lowering of the mold members 7 I provide flexible gas connections 26.

Supported in the upper rear end of the frame work is a dough receptacle C having an inlet opening closed by a flap 27 and an outlet opening closed by the measuring device shown in Figs. 8 and 9. This measuring device consists of a cylinder 28 rotatable within the cylindrical outlet end 29, said cylinder being formed with inlet openings 30 and outlet openings 31. The cylinder 28 is formed with a series of transverse walls 32 constituting intermediate chambers, each chamber being of a size to hold enough dough to form one cornet. The measuring cylinder 28 is connected at one end by links 33 and 34 to the upper end of a bar 35, the lower end of said bar being connected with a bent lever arm 36 having pivotal support 37 in the frame work and having pin and slot connections 38 at its lower end with a slidable supporting rod 39. The bar 35 is intermediately pivoted to one end of a bent lever 40, said bent lever having fulcrum support upon the supporting shaft of the dough receptacle and having pivotal connection at its outer end to a bar 41, the bar 41 being operatively connected with greasing means for the mold members 4, as hereinafter pointed out. Thus as the bar 35 is turned into the position shown in Fig. 1 it will raise the dough receptacle upon its support turning the measuring cylinder 28 into position bringing the inlet openings 30 into registration and allowing the chambers to be filled with dough. As the arms are further brought into position shown in Fig. 2 the dough receptacle will be lowered carrying the measuring chamber 28 into the position shown in Fig. 8 to bring the outlet openings 31 into registration and discharging the dough into the adjacent row of mold members 4, as shown in Fig. 2. The sliding rod 39 is actuated by means of a cam 42 carried by the main driving shaft and positioned between anti-friction rollers 43 mounted upon the sliding shaft 39.

In order to grease the mold members 4 I form the lower end of the lever arm 41 with a rack 44 intermeshing with a pinion 45 mounted upon the transverse shaft 46. The transverse shaft 46 has gear connection 47 with a series of pinions 48 each pinion supporting a brush 49 shaped to fit into the mold members 4. In order to impart longitudinal sliding movement to the brushes 49 I provide a stationary rack 50 intermeshing with the pinion 45 so that as the lever 41 is actuated to rotate the brushes it will by the engagement of the pinion 45 with the rack 50 longitudinally slide the brushes with their supports in the bearings 51.

The main driving shaft is actuated by worm and gear 52, and belt shaft 53, driven by suitable source of power through the medium of belt pulleys 54. The oven is preferably inclosed by a suitable shell 55 being open in its upper and lower end to accommodate the dough feeding mechanism and to allow the dropping of the cornets from the molds as well as the working of the brushes 49. A suitable discharge trough 46 is provided to receive the finished cornets.

In order to discharge the cornets I provide a cam 56 secured upon the shaft 2, the cam engaging with the plungers of the lowermost row of molds 4 as shown in Figs. 7 to depress said plungers and shove the cornets from the molds.

In operation with the parts in the position shown in Fig. 2 the dough will be discharged from the dough receptacle into the adjacent series of mold members 4. In this same position of the parts the mold members 9 and mold members 7 are in position in the next series of mold members 4 as indicated in Figs. 10 and 11. The continued operation of the machine raises the mold members 7, rotates the oven one step, bringing the next series of mold members 4 underneath the mold members 7 and through the medium of the lever arms carries the grease brushes 49 into and out of the adjacent series of mold members 4 as indicated in Figs. 1 and 2.

Referring more particularly to the operation of mold members 7 it will be noted that as the mold members 7 are carried to lower position by their actuating mechanism the plate 11 will be held back by the oven depressing the springs 12. Thus when the mold members 7 are raised the plate 11 will first force the cornets away from the mold members 7 by the action of the springs 12 allowing the mold members 7 to be raised without carrying with them any of the cornets. As the mold members 7 are raised it will force apart the upper ends of the levers 24 turning the lower or greasing ends of said levers into engagement with said mold members to grease the same.

It will be understood that a constant supply of heat will be furnished to the interior of the oven and to the mold members 7 by means of the gas connections heretofore described.

The brushes 49 have a three-fold object: First, they carry grease to grease the interior of the molds; secondly, they will by their rotating action remove from the mold members 4 any cornets that may have accidentally remained therein; and thirdly in case any of the plungers 6 have failed to return to normal position by the operation of the springs 5, the brushes will force said plungers back to normal position.

I claim:

1. In a machine of the class described, the combination with a rotary oven, of a plurality of rows of outer mold members carried by said oven, a row of coöperating interiorly heated inner mold members, feeding mechanism arranged in connection with said inner mold members, discharging devices arranged in the inner end of each of said outer mold members and means successively actuating the discharging devices of different rows as said oven is rotated.

2. In a machine of the class described, the combination with a rotary oven, of a plurality of rows of outer mold members carried by said oven, a row of coöperating interiorly heated inner mold members, discharging devices arranged in connection with said outer mold members, a plurality of rotary brushes constructed to fit said outer members, and means for imparting sliding rotary movement to said brushes for the purpose set forth.

3. In a machine of the class described, the combination with a rotary oven, of a plurality of rows of outer mold members inset in the wall of said oven, a row of coöperating inner mold members, a sliding plunger in the inner end of each of said outer mold members, means for successively feeding a predetermined quantity of dough to said rows of outer mold members, a cam successively actuating said rows of plungers in the rotation of said oven, and means for successively greasing the interior of said outer molds.

4. In a machine of the class described, the combination with a rotary oven, of a plurality of rows of outer mold members inset in the wall thereof, a row of coöperating interiorly heated inner mold members, a pressure plate arranged between said inner and outer mold members, feeding means arranged to work in connection with said outer mold members, discharging devices arranged in connection with said outer mold members, and means for greasing said mold members, for the purpose set forth.

5. In a machine of the class described, the combination with a rotary oven, of a plurality of rows of outer mold members carried thereby, a row of coöperating inner mold members, feeding mechanism arranged in connection with said outer mold members, a plunger in the inner end of each of said outer mold members, a cam arranged to successively actuate the rows of plungers, brushes fitted to said outer mold members, and means for intermittently imparting sliding and rotary movement to said brushes for the purpose set forth.

In testimony whereof I affix my signature in presence of two witnesses.

MARTIN BOHLIG.

Witnesses:
H. S. Johnson,
Hattie Smith.